United States Patent

Levasseur

[15] 3,660,641

[45] May 2, 1972

[54] CODED DATA STORAGE MEDIUM

[72] Inventor: Joseph L. Levasseur, St. Louis, Mo.

[73] Assignee: Simcom Corporation, High Ridge, Mo.

[22] Filed: Oct. 30, 1969

[21] Appl. No.: 872,595

[52] U.S. Cl............235/61.12 N, 179/100.2 A, 235/61.11 E, 340/174.1 A

[51] Int. Cl...................G06k 19/06, G11b 5/78, G06k 7/10, G11b 5/25

[58] Field of Search.......340/174.1 A; 179/100.2 A, 100.2 B, 179/100.3 B, 100.2 T; 235/61.12, 61.11 E, 61.12 N; 250/219

[56] References Cited

UNITED STATES PATENTS

| | | | |
|---|---|---|---|
| 3,020,800 | 2/1962 | Perry | 235/61.12 R X |
| 3,171,021 | 2/1965 | Jonker | 235/61.12 |
| 3,184,581 | 5/1965 | Willoughby | 235/61.11 E |
| 3,191,006 | 6/1965 | Avakian | 235/61.7 |
| 3,206,592 | 9/1965 | Nadler | 235/61.12 |
| 3,215,848 | 11/1965 | Zworykin | 250/219 Q |
| 3,474,230 | 10/1969 | McMillen | 235/61.7 |
| 1,857,451 | 5/1932 | Hansen | 179/100.3 B |
| 1,891,386 | 12/1932 | Kroesen | 179/100.3 B |
| 1,928,209 | 9/1933 | Mills | 235/61.12 |
| 2,732,899 | 1/1956 | Wales | 235/61.12 |
| 2,773,120 | 12/1956 | Masterson | 179/100.2 T |
| 2,851,676 | 9/1958 | Woodcock | 340/174 |
| 2,986,725 | 5/1961 | Dirks | 340/174.1 |

FOREIGN PATENTS OR APPLICATIONS

| | | | |
|---|---|---|---|
| 332,615 | 7/1930 | Great Britain | 179/100.3 |
| 1,007,289 | 2/1952 | France | 179/100.1 A |

*Primary Examiner*—Maynard R. Wilbur
*Assistant Examiner*—Robert M. Kilgore
*Attorney*—Charles B. Haverstock

[57] ABSTRACT

A coded data storage medium including a film strip having a particular form and arrangement of optically detectable images position encoded thereon.

19 Claims, 5 Drawing Figures

INVENTOR:
JOSEPH L. LEVASSEUR
BY Charles B. Haverstock
ATTORNEY.

PATENTED MAY 2 1972

3,660,641

INVENTOR:
JOSEPH L. LEVASSEUR
BY Charles B. Haverstock
ATTORNEY

INVENTOR:
JOSEPH L. LEVASSEUR
BY Charles B. Haverstock
ATTORNEY.

CODED DATA STORAGE MEDIUM

The subject invention relates generally to data storage means and more particularly to a film strip having position encoded optically detectable images located thereon in a novel arrangement to represent data including informational and control data.

The encoded film strip disclosed herein is for use in devices such as the device disclosed in copending Levasseur U.S. application, Ser. No. 787,648, filed Dec. 30, 1968, now U.S. Letters Patent No. 3,581,063, dated May 25, 1971 entitled Verification Means For Character Groups, and assigned To Applicant's assignee. There are many applications and uses for devices which are capable of optically detecting images on a record medium such as on a film strip including particularly many data searching applications. So far as known, however, no one heretofore has devised a film strip having optically detectable encoded images located and arranged on it in the particular arrangement and in the small amount of space as the images of the subject medium and no one has devised such a medium which has so many diverse uses and applications. Furthermore, no one heretofore has taught the construction and use of a coded medium having as much optically detectable data stored on it in as small a space and in as easily retrievable form as in the present device, and no one, so far as known, has constructed such a medium which lends itself so well to searching, identifying and locating information quickly and accurately using optical as distinguished from other forms of information detection or sensing means. In particular, it has not heretofore been proposed to provide a film strip capable of storing in coded form a listing of identifying indicia or symbols such as account numbers, parts numbers, or other information in a coded form such that the information can be quickly and accurately searched for some reason. Still further it has not been proposed heretofore to provide a coded medium or film strip which includes means in the form of test images which are used to individually test each position of a multi-position reading unit to make sure that all reading positions are operating properly before each searching of the list, and it has not been proposed heretofore to provide control images on a film strip which are detectable optically for various control and/or synchronizing purposes.

One application of the subject coded medium is in a device such as disclosed in U.S. Pat. No. 3,581,063 which is for use at a point of sale where customers buy goods or services on credit by offering the salesperson their credit cards. In such applications, a length of coded medium constructed along the lines of the present invention is encoded over most of its length with rows of dots with the dots in each row position encoded to represent account numbers that are known for some reasons to be objectionable. In this case, the account number on each credit card as it is presented is entered into the device and is compared using optical means with all of the account numbers coded on the film strip to see if it is included in the list. The subject coded medium can also be used to make "-good guy" checks to make sure that a particular account number is included in a listing of account numbers that are known to be acceptable before extending credit. The present medium also has many other uses and applications including uses and applications in inventory and any other application where it is desired to search by a comparison method to determine if a particular number or other form of identification is included in a listing.

It is therefore a principal object of the present invention to provide improved means for storing information in a form in which it can be quickly and easily searched.

Another object is to provide means by which a coded list of account numbers or other identification forms can be quickly and accurately searched to see if a particular number is included in it.

Another object is to provide improved coded storage means which include information in an encoded form such that it can be detected or sensed optically.

Another object is to provide a novel test pattern on a film strip or like data storage medium to test whether every position of a multi-position optical detecting device used for sensing information stored on the medium is operating properly.

Another object is to provide improved means for storing information in an easy to handle and rapidly retrievable form.

Another object is to provide means for storing information in a minimum of space.

Another object is to minimize the possibility for error when optically sensing images position encoded on a film strip or like medium.

Another object is to provide a simplified form of coding for use in locating images on a medium.

Another object is to provide means for quickly and accurately checking the operating reliability of a plurality of light sensitive detectors.

Another object is to make it practical at the point and time of a credit sale to check to see if an account number assigned to a credit card or like device is included in a list of account numbers.

These and other objects and advantages of the present invention will become apparent after considering the following detailed disclosure which covers several preferred embodiments thereof in conjunction with the accompanying drawings wherein.

Figure 3:
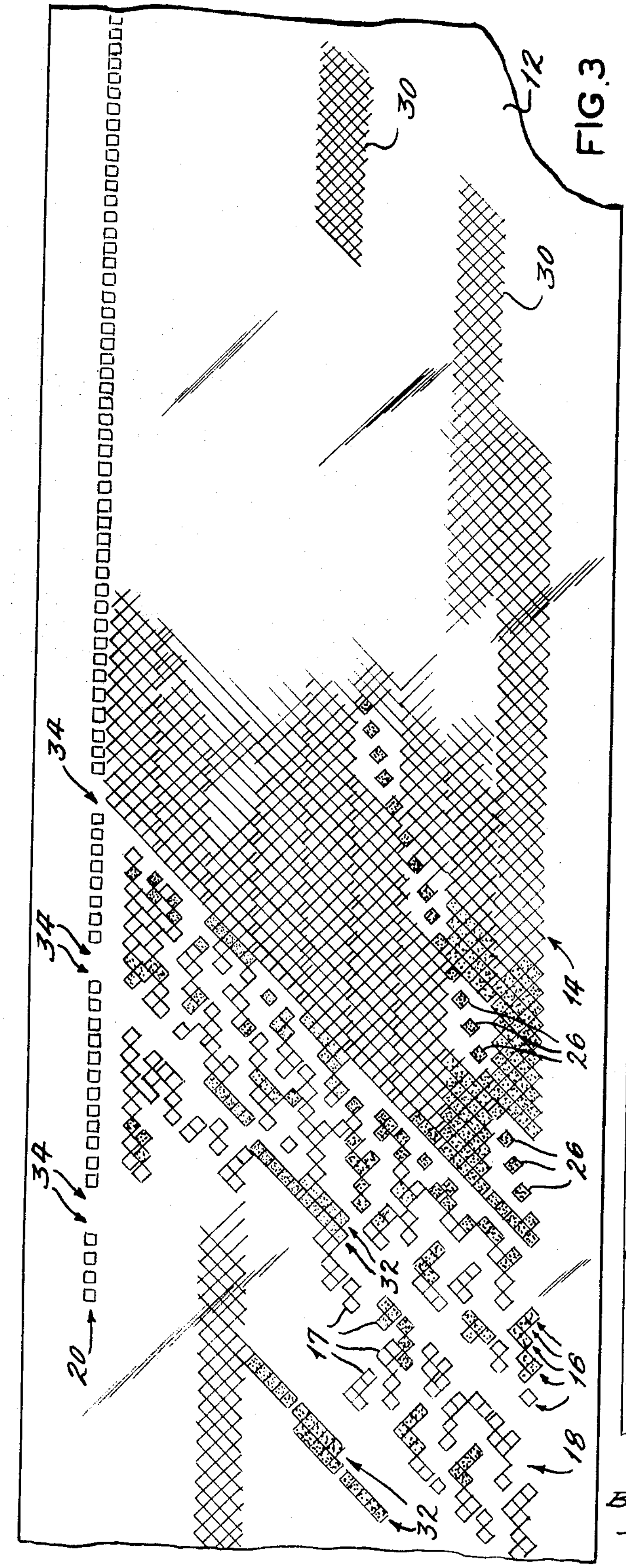
FIG. 3 is an enlarged fragmentary top plan view of a somewhat larger portion of the film strip of FIG. 1 that is shown in FIG. 2.
Figure 1:
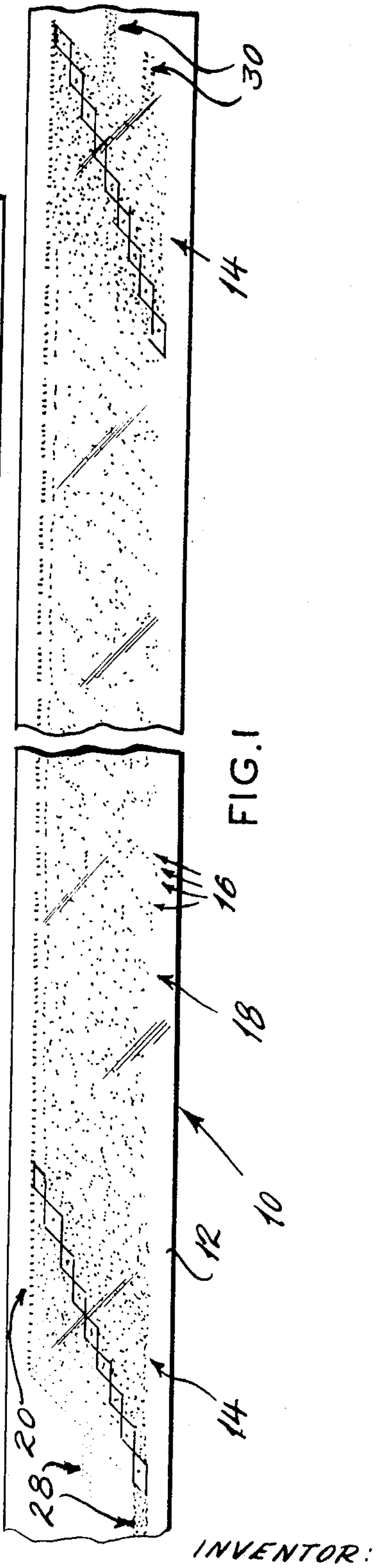
FIG. 1 is a top plan view of a portion of a film strip having optically detectable images position encoded thereon according to the present invention.
Figure 2:
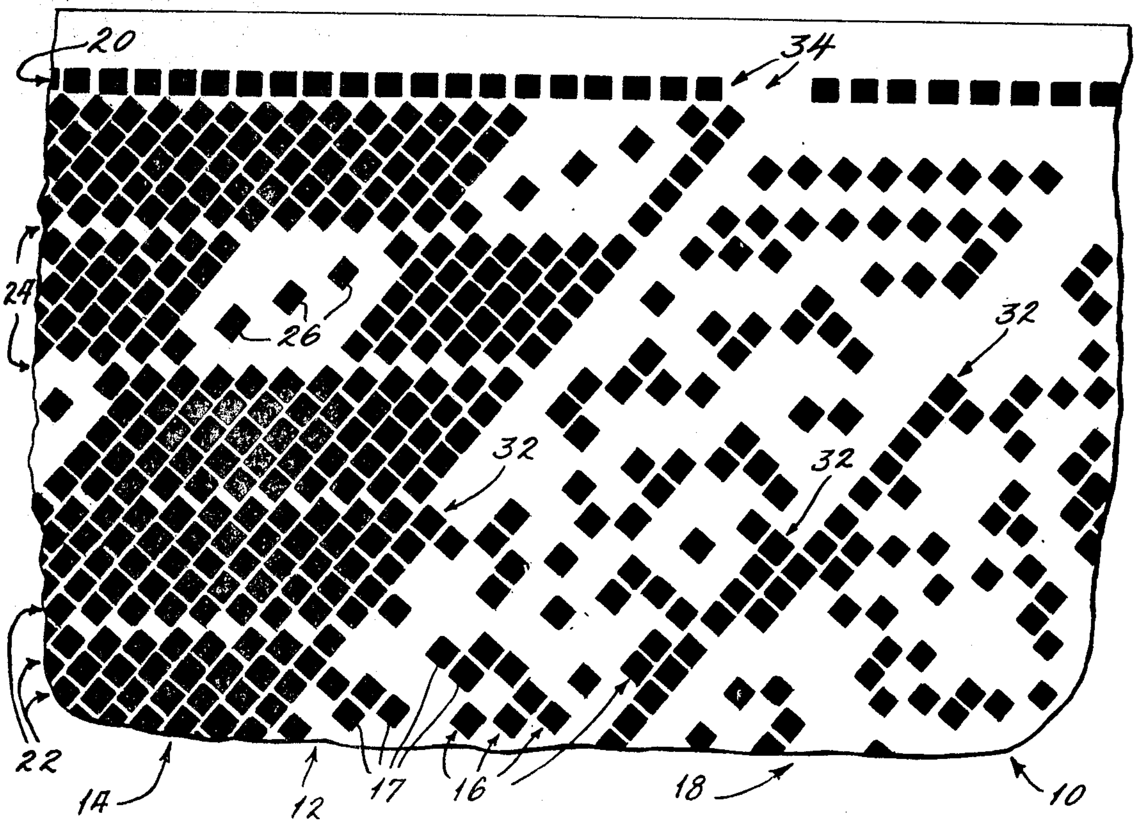
FIG. 2 is an enlarged fragmentary top plan view of a portion of the film strip of FIG. 1.

Referring to the drawings more particularly by reference numbers, number 10 in FIGS. 1–3 refers generally to a coded medium such as a film strip having a plurality of optically detectable images position encoded thereon. The medium 10 in the embodiment shown includes a transparent strip of film 12 such as a strip of 8, 16 or 35 millimeter film. The shapes and locations of the opaque images or areas position encoded on the film 12 are important to the present invention for reasons that will be explained. There are also many uses and applications for film strips having images position encoded thereon along the lines of the present disclosure and the particular embodiments shown and described herein have been selected because they are typical and because they are particularly applicable for use in devices such as the devices disclosed in Applicant's copending application, Ser. No. 787,648, filed Dec. 30, 1968, now U.S. Letters Patent No. 3,581,063 and assigned to Applicant's assignee. While the film strip 12 is shown as being transparent and the images opaque, it is also contemplated to use an opaque or semi-opaque or even a translucent film strip having images represented as transparent, translucent or even reflective areas without departing from the spirit and scope of the invention. The important thing is that the images be properly located so that they can be detected or sensed using optical reading or sensing means. The images are also position encoded on the film to represent particular identifications such as account numbers and the like.

Several different kinds of images are included on the film strip 12 and are used for different purposes as will be explained. Furthermore, the particular image arrangements shown are for illustrative purposes and it is recognized that other similar or equivalent arrangements are possible. The arrangements shown, however, are typical of many arrangements that could be used although the form of coding shown and described herein can be varied substantially and several different forms of codes will be described.

In addition to the information coded portion of the film, the film as shown in FIG. 1, also has two similar test patterns 14 formed by groups of images located near opposite ends thereof. The test patterns 14 are made up of many images or dots located on the film strip in positions to control light passing through the film strip between a source of light and a plurality of distinct sensor elements located in a multi-position sensing unit used for reading or sensing the information encoded on the film strip. The dots in the test pattern are located so that during movement of the test pattern past the read station the operation of each sensor element in the sensing unit will be individually checked to make sure it is operating properly. This is done so that the operator will know that the sensing unit is operating properly in all of its sensing positions at the beginning of each search operation, it being possible to search all of the stored information data on the film during movement of the film strip through the machine in one direction. This means that the film can be searched during each direction of movement past the read or sensing unit without having to rewind the film and with the same assurances that all of its elements are working.

The main information portion of the film strip 12 is formed by a plurality of adjacent columns 16 of position encoded opaque areas or dots 17, each column of which represents all or part of a particular identification or account number. In the usual case, the columns 16 occupy most of the length of the film strip 12 in the area designated generally by the number 18, and each of the columns 16 extends most of the way across the film strip at some desired angle preferably but not necessarily an acute angle relative to the length of the film strip. The number of columns included depends on the number of account numbers or other identifications to be encoded, and it is expected that in the usual situation the columns 16 will occupy most of the space between the test patterns 14.

One or more longitudinally extending rows of spaced coded areas or dots 20 (FIGS. 1–3) are also provided on the film strip 12 along or adjacent to one or both side edges of the film. The row or rows 20 are provided for control and/or synchronizing purposes and the spacing of the dots in the row 20 can be varied as required. For example, the dots in the row 20 can be used to control the speed of movement of the film past the read unit or station in the manner disclosed in U.S. Pat. No. 3,581,063. The same or a similar row 20 of dots can also be used to synchronize or control the reading operations in which case the dots in the row 20 can be aligned respectively with the dots 17 in the columns 16. This can be done to prevent the possibility of reading parts or two adjacent columns of dots at one time as will be explained. Synchronizing in this sense may also include controlling the reading so that only predetermined portions of the dots 17 in each of the columns 16 are read in order to prevent cross-talk between the reading of the dots in adjacent columns 16 thereby reducing the possibility for reading errors. The presence or absence of dots in the row 20 can also be used for instruction and code control purposes as will be explained.

As above stated, the dots 17 in each of the columns 16 in the main information region 18 represent one or part of one account number or other identification such as a number assigned to a credit card holder, a number assigned to represent a part in an inventory application, a number or a word in a listing, or any other number, word or symbol or combination thereof that can be represented in coded form by a plurality of position encoded dots. The coded information can also represent alphabetical, alphanumerical or combinations of alphabetical, alphanumeric and numeric identifications.

FIGS. 2 and 3 are enlarged views of portions of the film strip 10 and are included to illustrate in greater detail one form of coded images. In this embodiment the coded images or dots 17 are shown as being square in shape and are arranged in parallel rows 22 running lengthwise of the film strip and in the parallel columns 16 extending across the film at some angle. The longitudinally extending rows 22 are shown arranged in groups of five rows each with the adjacent rows 22 in each group spaced from each other by relatively narrow spaces therebetween and the adjacent groups spaced from each other by wider spaces 24. With this arrangement there are a plurality of five dot position groups in each diagonal column 16 across the film. This is a sufficient number of dot positions in each group using a two-out-of-five constant ratio code to encode one numerical digit of an account number in each group. In an application in which an account number has nine numerical digit positions it will therefore be necessary to provide nine groups of five possible dot positions each, or 45 possible dot positions, in each column 16 across the film strip 12 to encode the account number. It should be clearly understood, however, that other groupings of the rows 22 could also be used as desired and the rows can also be uniformly spaced across the film without any grouping being provided. For reasons which will be explained later in connection with FIGS. 4 and 5, it is also preferable, though not essential, to use rectangular shaped dots with the longer dot dimensions parallel to the length of the film strip, and it is usually also desirable to provide some space between the dots in adjacent rows 22 in order to minimize or prevent cross-talk between adjacent sensing elements in the sensing unit that are used to sense or read the dots. This can be readily understood by referring to the sensing means disclosed in copending U.S. Pat. No. 3,581,063.

The information portion 18 of the film strip 12 (FIG. 2) contains the position encoded dots 17 which represent the various account numbers or other identifications. It is important to note that the columns 16 are set at a diagonal angle relative to the length and width of the film strip. This is done to increase the length of the columns 16 relative to the width of the film strip and to provide greater distances between the centers of the adjacent dots in each column. This may be an advantage from the standpoint of making the film strips, and it also enables more space to be provided between the centers of adjacent sensor elements in the sensor unit used to read the dots. Also the longer diagonal columns 16 may to some extent improve the accuracy and reliability of the reading means. It is possible and contemplated, however, to have the columns 16 extend transversely of the film without departing from the basic novel features of the invention.

In the particular embodiments shown, a two-out-of-five constant ratio code is used for encoding numerical information. This is done to simplify the understanding. In such a code each group of five possible dot positions in each diagonal column 16 is sufficient to encode one digit of a multi-digit number. This is because each number digit from 0 to 9 can be represented by a different pair of dots in each of the five possible positions of each group. In a typical two-out-of-five constant ratio code, dots in the first two positions of a group may be selected to indicate a particular digit such as the digit zero, dots in the first and third positions can be selected to indicate a digit one, dots in the first and fourth positions to indicate a digit two, and so on. Thus by having dots in the proper positions in each group of each of the diagonals of the area 18, it is possible to encode any numerical identifier depending upon the number of five dot groups available. It is a simple matter to change the number of dot positions in each group and also to change the number of groups as required. For example, by increasing the number of dot positions in a group from five to seven and changing from a two-out-of-five to a three-out-of-seven constant ratio code the number of possible characters that can be encoded is increased from 10 to 35 which is large enough to accommodate alphabetical as well as numerical information. Many other dot group sizes and constant ratio codes could also be used depending on the number of possible characters to be encoded. For simplicity, however, the invention is shown and described in connection with a simple two-out-of-five constant ratio code.

It is also contemplated to expand the capacity of the film strip so that it can accommodate even larger account numbers. This can be done by increasing the film width, decreasing the space between adjacent dots, using two or more columns 16 to represent each account number or other identifier, or using combinations of these. Different group sizes in the same columns 16 could also be used to encode alphanumeric information. If the number of columns required to encode a single account number is greater than one, some means will usually also be needed in the reader control to control the time of reading or to prevent the reading of only part of an account number at a time. Such a reader might also include more than one row of sensors or it might include storage means to store information read in one row for later comparison. Another possibility is to provide the same number of columns of sensors in the sensing means as are required to encode one account number or other identifier and then include means for controlling or synchronizing the reading times so that the sensors only read when in position to read an entire account number. Such changes and variations do not involve any change in the basic structure of the subject coded film strip or in the construction or operation of the film reading means associated therewith.

The test patterns 14 shown in FIGS. 1–3 are formed to provide means as aforesaid for testing individually each sensor position of a multi-sensor read head having the sensors positioned thereon for reading the dots in associated rows 22 as the film moves past. It is very important to know that each sensor position is operating properly each time before the main coded portion of the film is read. This assures that the film strip is in proper registration or reading position and that all positions are operating as they should. This is especially important to know in advance because the small size and close spacing of the dots 17 require extreme reading accuracy especially when it is considered that there may be 45 or move information dots in a single column 16 as well as one or more control dots across a film strip, such as a 16 millimeter film strip. The test patterns 14 also provide a check as to whether there is any dirt or other foreign material located so as to possibly interfere with normal operation. The importance of reading accuracy cannot be over-emphasized especially when it is realized that to make the subject device practical for applications such as at points of sale, a film strip with thousands or even tens of thousands of coded identifiers or account numbers must move past the read station in a matter of a very few seconds. Under such circumstances even slight malfunctions cannot be tolerated.

The test patterns 14 include columns 16 of dot groups with dots in all positions of all of the groups but one group in each column, and in that one group in each column only one dot is present in one of the five possible positions. These dots are identified in FIGS. 2 and 3 by the number 26. In this way, as can be seen, a different dot position of each dot group is tested in each five adjacent columns of the test pattern. Also each column 16 of the test pattern not only tests a different dot position but it also tests the means that read each dot position including individually testing the operation of each of the different sensor elements included in the read unit. This means that as the test pattern moves past the row of sensor elements in the read unit every individual dot position and every individual sensor is individually tested to make sure that everything is operating properly. It should be borne in mind also that during a test operation, a particular number or other indicia to be searched for must first have been dialed into the machine in the usual way as discussed in U.S. Pat. No. 3,581,063 and the test produced by the test pattern 14 may also be a test as to the correctness of the form of the dialed in number. The dialed in indicia to be searched is such that all but at least one of the dot positions in each column of each group, as it is tested, will be blocked from receiving light. At the time that each dot position is being tested all of the sensor elements reading all of the dot positions in the other dot groups will be blocked from receiving light because of the form of the test pattern. However, because of the form of the test pattern a similar test will be performed for each dot position of each group as that position moves past the read unit. It is also important to note that the test of each operating position can be made by the test pattern regardless of the particular indicia that is dialed into the device. The circuits that are connected to the sensors and used to make the test include gate type circuits such as are disclosed and described in U.S. Pat. No. 3,581,063. The circuits, however, as well as the sensors and associated control means are not part of the present invention which is limited to the form of coded film strip disclosed herein.

A similar test pattern is preferably included at or near each opposite end of the film strip so that a complete check of the operation is made before and/or after each reading operation. This is desirable since it is anticipated that the film strip will move in opposite directions past the read station on succeeding operations of the machine.

It is also contemplated and within the scope of the present invention to use positive or negative film strips and to make the sensors in the read unit respond to the presence or absence of dots in the various dot positions. The dots can also be made of a reflective substance in which case the sensors and the light source could be mounted on the same side of the film strip. The use of opaque dots on a transparent film or the complement thereof, however, is usually preferred over using reflective areas mainly because it is easier to fabricate such a construction, and such a construction also has a better light to dark ratio. Also there is not nearly as much light attenuation when the light passes through a film strip having transparent and opaque areas as when the light must be reflected.

Referring again to FIGS. 1–3, there are shown other groups of control dots 28 and 30 which are arranged in longitudinally extending rows positioned respectively adjacent opposite ends of the film strip 12 in the regions thereof beyond the associated test patterns 14. The dot rows 28 and 30 are provided and located to control the direction in which the film strip will move during each operating cycle. For example, when the film is at one end of its travel, it is necessary to energize the film drive means to move the film in one direction past the read station, and when the film is at the opposite end of its travel it is necessary to energize the drive means to move it in the opposite direction. Also since it may not be known exactly where the film will stop after a read operation, it is necessary to have the dots in the groups 28 and 30 arranged in extended longitudinal rows to cover all possibilities. There should also be differences in the positions of at least some of the dots in the groups 28 and 30 at the different ends of the film strip so that they can perform their intended functions. The dots in the groups 28 and 30 can also be replaced by elongated stripes, if desired.

Other optional dots or dot groups shown in FIGS. 1–3 as the five dot groups 32 are located at spaced locations along the film as required and are used for various control and instruction purposes. The control groups 32 are usually of one or two column duration and are further distinguishable from the information coding by the absence of (as shown), or by the presence of, a control or strobe dot at the locations identified by the number 34. The dots in the groups 32 in conjunction with the absence or presence dots in positions 34 are used to condition circuits which are not part of this invention in some way to provide means for enabling reading, non-reading or some other function in connection with the movement of different portions of the coded information past the read station. The control dots 32 and 34, for example, can be used to program circuits associated with the reading means so that certain information will be read and other information will not be read. They can also be used to change from reading one kind of coded information to reading another kind of coded information. One specific use for the control dots or groups 32 and 34 is to terminate, or commence, a reading operation at some intermediate location along the film strip as the film is moving so that certain portions only of the coded information will be read and other portions omitted or skipped. This is useful in situations such as where a single film strip contains more than one listing of coded information, each listing of which pertains to a different matter, such as having several lists of credit card account numbers each of which is a list for a different company. In such cases, the control dots or groups 32 and 34 condition circuits so that certain portions of the film, but not others, will be read during each pass of the film past the read station. In the device as shown, pairs of groups 32 are positioned in two adjacent columns at the desired intermediate locations along the film so that each of the two adjacent groups 32 control whether the information that extends thereto in the region 18 will be read or omitted each time it moves past the read head. In other words, when the film is moving past the read station, regardless of its direction of movement, it will pass pairs of control groups 32 in adjacent columns and the first groups to pass will either be ignored or will terminate a read operation and the groups 32 in the adjacent column will control means which will either cause a reading operation to commence or prevent reading of the information in the portion of the film that is next to pass the read station. The operation of the control groups is usually under control of a group selector control (not shown) on the device used for reading the film strip and as such is not part of the present invention. Similar control groups 32 must be located between each pair of succeeding information storage portions on the film so that only those columns will be read, or omitted, as programmed, regardless of the direction in which the film is moving.

The absence or presence of a control or strobe dot in positions 34 may perform other control functions, in addition to enabling reading of the groups 32, such as producing "and" control functions, controlling the reading of dot patterns at various locations on the film as aforesaid, providing a check digit operation, providing a credit authorization operation and so forth. There are also many other possible uses for special dot groups such as the group 32 including identifying different parts in an inventory application and so on, and the particular form and/or arrangement of the dots in the control groups 32 can be varied considerably as desired.

Figure 4:
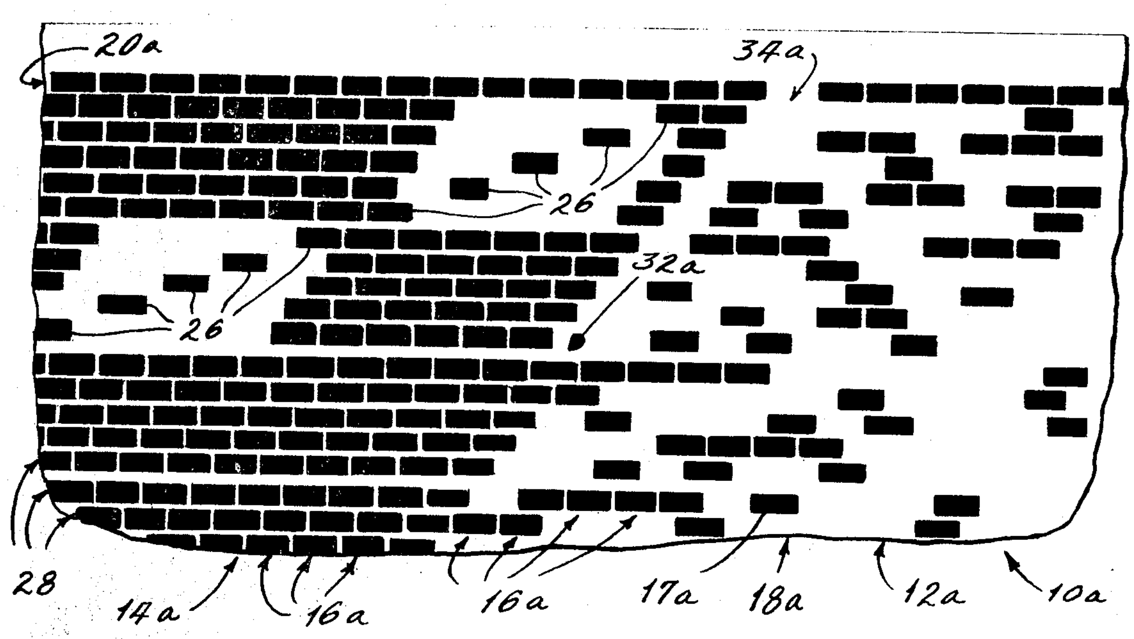
FIG. 4 is another enlarged fragmentary top plan view showing a portion of another embodiment of a film strip constructed according to the present invention.
Figure 5:
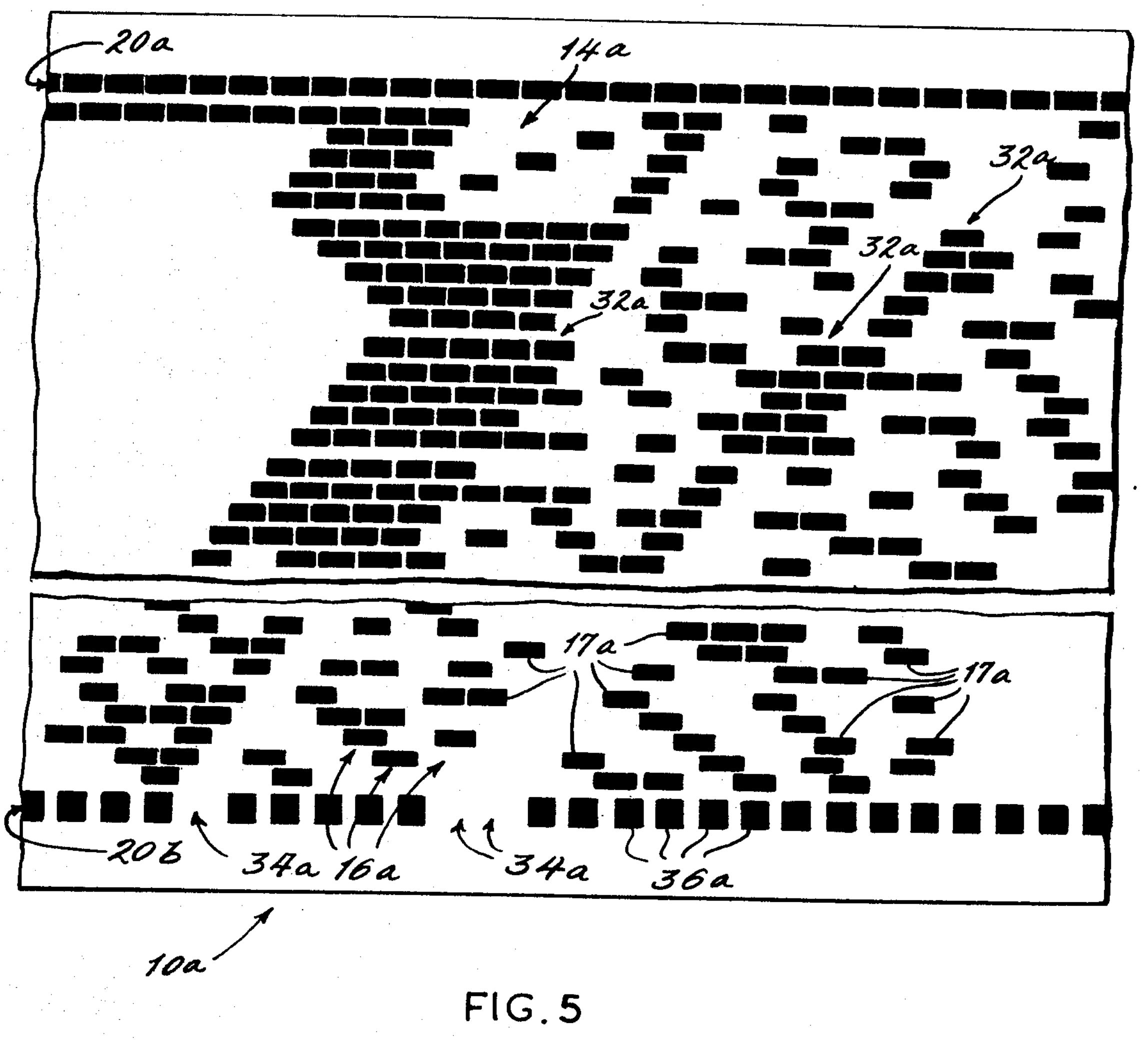
FIG. 5 is an enlarged fragmentary view showing more of the details of the coded film strip of FIG. 4.

The embodiment of the film strip shown in FIGS. 4 and 5 is similar to the embodiment of FIGS. 1–3 including having coded areas, test patterns and control dots, and the coded portions of the embodiment of FIGS. 4 and 5 are identified by the same numbers as the corresponding portions of the embodiment of FIGS. 1–3 but with the subscript "*a*." The main difference between the embodiment of FIGS. 4 and 5 and the embodiment of FIGS. 1–3 is that the embodiment of FIGS. 4 and 5 employs rectangular dots **17*a* instead of square shaped dots 17, and in the construction of FIGS. 4 and 5 the rectangular dots 17*a* are arranged to be oriented with their longer dimensions parallel to the length of the film 12 instead of being at the same diagonal angle on the film as the columns in which they are positioned. The use of rectangular dots 17*a* has advantages as well as disadvantages over using square dots, and rectangular dots are usually preferred. One of the advantages of rectangular dots 17*a* as shown in FIGS. 4 and 5 is that there is less problems with cross-talk but at the same time less information can be encoded per unit length of film for a given dot area size than with square dots oriented as shown in FIGS. 2 and 3**, for example. The problem of cross-talk when using square dots, however, can be overcome to some extent by restricting the portions of the dots that are actually sensed, but for dots of the small size contemplated for the present device the possibilities for providing reading tolerances are at best relatively limited. If reading tolerances are kept within reasonable limitations, however, square dots will provide very satisfactory operation. It is also contemplated to use dots or other shapes and sizes as well as including using round, oval and various polygonal shapes without departing from the spirit and scope of the invention.

The single longitudinally extending row of control dots 20 in FIGS. 1–3, and **20*a* in FIGS. 4–5, which extends adjacent to one or both side edges of the film, is provided, as aforesaid, to control the speed of movement of the film as it moves past the read head or station as clearly disclosed in U.S. Pat. No. 3,581,063. The same or a similar row of dots such as the row 20*b* of dots 36*a* in FIG. 5 can be used to provide a strobe action to control the reading times of the read unit such as to synchronize the reading times so that the read head will only be able to read predetermined portions of the dots in each of the columns 16*a*. This can be accomplished as clearly shown in FIG. 5 by having strobe dots 36*a* shorter in their longitudinal dimensions that the information dots 17*a* and the control dots 32*a*. Thus, if the strobe dots 36*a* control the reading times, it is apparent that less than all of the dots 17*a* and 32 *a* will be read, the read portions being preferably centered longitudinally to provide some longitudinal tolerance between the reading of dots in adjacent columns 16*a*. This will also reduce or prevent the possibility for longitudinal, as distinguished from lateral, cross-talk. It can therefore be seen that the embodiment shown in FIGS. 4 and 5 is very similar to the embodiment of FIGS. 1–3** except for the shape and orientation of the dots. Both embodiments are also read and used in the same or similar manner.

Thus there has been shown and described novel film means coded with information represented by rows and columns of dots which are positioned to be sensed by optical sensing means. The subject coded film provides means by which lists of information can be put into a very compact and easy to search form. The subject means also provide relatively inexpensive means for supplying such lists for use even at points of sale and other places, whereby a sales person can quickly and accurately determine if a particular account number or other identifying means is included in the list for some reason. The possibilities for use of film strips such as described herein are many and varied and so far as known, it has not heretofore been proposed or contemplated to store as much information in as small a space and in an optically detectable form as disclosed in the present invention. It is not intended therefore to limit the present invention to the particular embodiments shown and described herein, but instead to cover all reasonable and obvious variations and applications.

What is claimed is:

1. Coded information storage means for use in searching a listing of multi-integer identifiers to determine by direct optical comparison if a particular multi-integer identifier is included, the coding of said particular multi-integer identifier being represented by a row of aligned light conducting and non-light conducting regions position encoded to represent the particular multi-integer identifier, said storage means comprising a strip of film for reading by moving through a spaced formed by and between a light source and a light sensing unit, said light source and light sensing unit being located on opposite sides of the row of aligned light conducting and non-light conducting regions that represent the particular multi- integer identifier, and means forming a plurality of distinct optically detectable photographically recorded dot images position encoded on the film strip, said dot images including a plurality of parallel spaced columns of aligned dot images extending transversely across the film strip at an angle relative to the length thereof, the dot images in each column being position encoded therein in groups with at least two dot images in each group, the positions of the dot images in each group being position encoded therein according to a constant ratio code to represent an integer of a multi-integer identification indicia, each of said parallel columns having the same number of dot images therein to encode the same number of integers of a multi-integer indicia and all of the dot images in each row being positioned in alignment to be simultaneously read as the column moves into registration with the row of aligned light conducting and non-light conducting regions that represent the particular identifier being searched and in the space between the light source and the light sensing unit, the position encoding of the dot images on the film strip being complementarily encoded as compared to the encoding of the light conducting and non-light conducting regions representing the particular identifier so that only direct optical comparison of encoding representing the same identifier and indicia will be able to prevent light from the light source from reaching the light sensing unit during movement of the film strip therebetween.

2. Coded information storage means for use in searching a listing of multi-integer identifiers to determine by direct optical comparison if a particular multi-integer identifier is included, the coding of said particular multi-integer identifier being represented by a row of aligned light conducting and non-light conducting regions position encoded to represent the particular multi-integer identifier, said storage means comprising an elongated strip of film having predetermined overall light conducting properties and distinct areas of different light conducting properties photographically recorded on the film, said strip of film being constructed to be read by being moved lengthwise through a space formed by and between a light source and a light sensitive assembly including at least two spaced light sensitive members, said light source and said light sensitive assembly being located on opposite sides of the row of aligned light conducting and non-light conducting regions that represent the particular multi-integer identifier, said areas of different light conducting properties on the film including a plurality of adjacent columns each formed by a plurality of said distinct areas arranged in parallel rows extending across the film strip at an acute angle relative to the length thereof, each of said columns having the same number of said distinct areas, the said areas in each column being arranged in groups with the areas in each group being position encoded therein according to a constant ratio code to represent an integer of a multi-integer identification word, each column having the areas in the several groups position encoded to represent a different identification word, said rows moving successively into registration with the row of aligned light conducting and non-light conducting regions that represent the particular identifier being searched and in the space between the light source and the light sensing unit, the position encoding of the dot images on the film strip being complementarily encoded as compared to the encoding of the light conducting and non-light conducting regions representing the particular identifier so that only direct optical comparison of encoding representing the same identifier and identification word will be able to prevent light from the light source from reaching the light sensing unit during movement of the film strip therebetween.

3. The coded information storage means defined in claim 2 including a test pattern formed of said areas of different light conducting properties, said test pattern including a plurality of adjacent columns of said areas each of which has the areas positioned therein located so as to enable an optical test to be made of the coding of a different selected one of the possible area positions therein.

4. The coded information storage means defined in claim 3 wherein a similar test pattern is formed adjacent each opposite end of the film strip, the portion of the film strip extending between said test patterns being substantially entirely occupied by said plurality of adjacent columns of said areas encoded to represent different identification words.

5. Coded information storage means for use in searching a listing of multi-integer identifiers to determine by direct optical comparison if a particular multi-integer identifier is included, the coding of said particular multi-integer identifier being represented by a row of aligned light conducting and non-light conducting regions position encoded to represent the particular multi-integer identifier, said storage means comprising an elongated strip of flexible photographic material having distinctive photographically recorded regions of light conducting and non-light conducting characteristics, said strip having a plurality of distinct optically detectable images positioned thereon, said images being arranged in groups of spaced images with the images in each group being position encoded therein to represent a distinct identification indicia, a plurality of said groups of position encoded images being arranged in adjacent parallel columns of said areas all of which extend across the strip at an angle relative to the length thereof so that each column contains sufficient position encoded groups of areas to represent a multi-indicia word, said columns of position encoded areas occupying most of the area along the length of the strip, the encoding of the images on the strip being the optical complement of the encoding of the images of said particular multi-integer identifier so that only when a multi-indicia word encoded on the strip which represents the said particular multi-integer identifier being compared is placed in registration with the coding for said particular identifier during move-ment of the strip will the combined registered encodings interrupt light passage, all possible image positions in each corresponding group of images in each of the folumns being located in a band which is parallel to the length of the strip so that corresponding groups can be sensed by stationary sensing means during movement of the strip along a direction parallel to the length thereof.

6. The coded information storage means of claim 5 wherein each of said columns of images extends across the film at an acute predetermined angle relative to the length thereof.

7. The coded information storage means of claim 5 wherein each of said images is a distinct photographically recorded dot.

8. The coded information storage means of claim 5 including a test pattern including a plurality of adjacent columns formed of a plurality of distinct images, the images in the different test pattern columns being positioned therein so that each possible image position in each group of images is distinctively represented in at least one column of the test pattern.

9. Means for encoding multi-integer identification indicia so that a large number of similar type indicia can be sensed and searched quickly and accurately by direct optical comparison between complementary encoded first and second multi-integer identifiers using a stationary optical sensing means including a light source, a plurality of sensor elements spaced therefrom and a plurality of light conducting and non-light conducting regions position encoded in the space between the light source and the sensor elements to represent the first identifier, said encoding means comprising an elongated film strip having photographically recorded on one surface thereof distinct areas of a first light conducting property located in areas of the film strip that have light conducting properties different from the distinct areas, said areas of first light conducting properties including a plurality of dots arranged in a plurality of adjacent parallel rows extending transversely across the film strip for movement past and parallel to the sensing means so that all of the distinct areas in each of said rows are simultaneously and successively placed in optical registration with the light conducting and non-light conducting regions that represent the first identifier, each of said parallel rows representing a second multi-integer identifier for direct optical comparison with the encoded first identifier, said plurality of adjacent parallel rows of dots occupying most of the area of said one surface of the film strip over the length thereof, there being more possible dot positions in each of said parallel rows than there are dots, the ratio of dots to possible dot positions being constant in each row, the possible dot positions and dots in each row being subdivided into groups of dots and possible dot positions with the dots in each group of possible dot positions being position encoded therein according to a constant ratio code to represent the different integers of one of the second identifiers, the dots in each row being positioned therein to control which sensor elements receive light from the light source during movement of the film strip thereby light from the light source being prevented from reaching the sensor elements only when the encoding for the first and second identifiers being compared are complementarily identical.

10. The means defined in claim 9 including a row of dots positioned extending lengthwise of the film strip, said lengthwise extending row being used for control purposes.

11. The means defined in claim 9 wherein said dots are square in shape, and the rows of dots extend diagonally across the film strip relative to the length thereof.

12. The means defined in claim 9 wherein said dots are rectangular in shape having their longer dimensions oriented to be substantially parallel to the length of the film strip.

13. The means defined in claim 9 wherein the groups of dots in each of said dot rows on the film strip are position encoded in the groups to represent the integers of a multi-integer second identifier, each of said multi-integer second identifiers representing an account number.

14. The means defined in claim 9 wherein at least two adjacent rows of dots are required to encode each second identifier.

15. The means defined in claim 9 wherein selected rows of dots have a control dot associated therewith.

16. The means defined in claim 9 wherein each row of dots includes a reading control dot, the reading control dot for each row having a shorter dimension parallel to the length of the film strip than the position encoded dots in the associated rows.

17. The means defined in claim 9 including a test pattern formed by other rows of dots located on the film strip, said test pattern having the dots in each different row thereof positioned to test the operation of a different one of the sensor elements.

18. The means defined in claim 9 including control dot groups located between selected adjacent rows of the position encoded dots along the film strip, said control dot groups being used to control the operation of the sensing means.

19. The means defined in claim 9 including at least one longitudinally extending row of dots positioned extending to adjacent each opposite end of the film strip, the position of at least some of the dots in said rows being different at each opposite end of the film strip, the dots in said rows being used to control the direction in which the film strip will move on the next reading operation thereof.

* * * * *